Nov. 10, 1942.  E. B. LEAR  2,301,888
RIVET SET
Filed Sept. 26, 1939
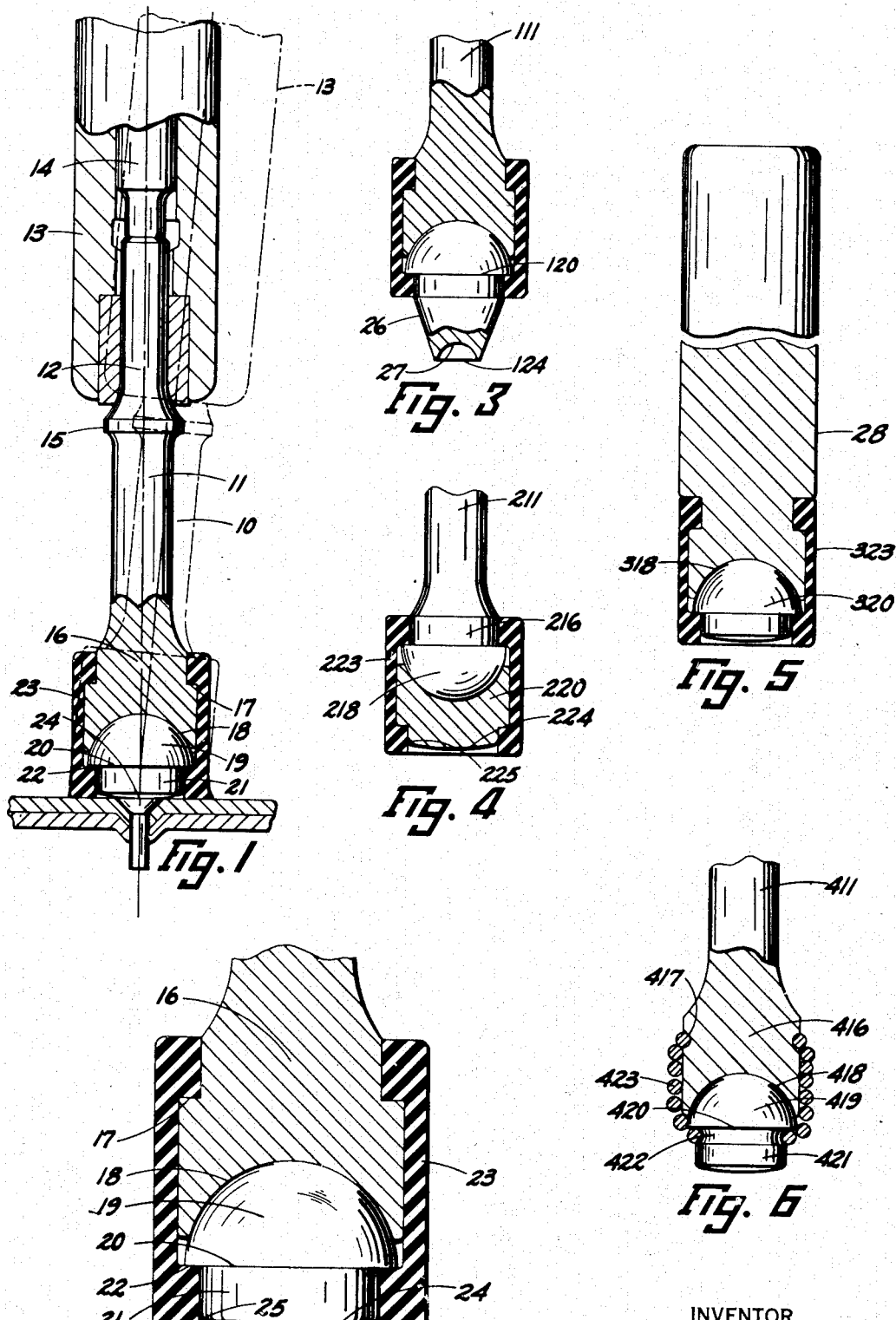
INVENTOR
*EARL B. LEAR*
BY
ATTORNEY Patented Nov. 10, 1942

2,301,888

UNITED STATES PATENT OFFICE 2,301,888

RIVET SET

Earl B. Lear, Garfield Heights, Ohio, assignor to The Cleveland Pneumatic Tool Company, Cleveland, Ohio, a corporation of Ohio Application September 26, 1939, Serial No. 296,638

5 Claims. (Cl. 78—53.5)

This invention relates broadly to riveting hammers, but more particularly to improvements in rivet sets.

One object of this invention is to produce an improved rivet set designed and constructed in a manner enabling perfect contact of the rivet set with the rivet irrespective of the misalignment of the riveting hammer relative to the center axis of the rivet, thereby facilitating the use of riveting hammers and overcoming the danger of upsetting the rivet eccentrically relative to its center axis.

Another object of this invention is to produce an improved rivet set wherein the rivet's contacting face is capable of limited swiveling motion relative to the rivet set.

Another object of this invention is to produce a rivet set with resilient means frictionally engageable with the work for preventing accidental slippage of the rivet set from the rivet during the riveting operation.

Another object of this invention is to produce an improved rivet set forming a compact assembly which is strong, durable and efficient.

In the drawing:

Fig. 1 is a longitudinal elevational view partly in section of the improved rivet set mounted within the front end of a riveting hammer.

Fig. 2 is an enlarged view of the front end of the rivet set shown in Fig. 1.

Fig. 3 represents the front end of a rivet set embodying a modification of the invention.

Fig. 4 is a view similar to Fig. 3 illustrating another modification of the invention.

Fig. 5 illustrates a bucking bar embodying the invention.

Fig. 6 is another modification of the invention.

Referring to the drawing, 10 represents the rivet set assembly including a shank member 11 formed with a reduced portion 12 of a conventional size adapted to be inserted into the front end of a riveting hammer 13 to receive the impacts of a reciprocatory piston 14. Intermediate the ends of the shank member 11, there is provided a collar 15 limiting the penetration of the reduced portion 12 into the hammer 13. The other end of the shank member 11, hereinafter referred to as the front end of the shank member, is enlarged as at 16 and provided with an annular shoulder 17. The front face of the enlarged portion 16 is formed with a semispherical socket 18 within which is swivelly mounted the semispherical end 19 of a head 20, which head is provided with a reduced cylindrical outer end portion 21, and intermediate its ends with an annular shoulder 22. The head 20 is secured within the socket 18 by a sleeve 23 engaging the shank's shoulder 17 and the head's shoulder 22, which sleeve is preferably made of resilient material such as rubber. In practice, the sleeve 23 is made to fit snugly on the enlarged portion 16 over the shank member 11 and is of a length calculated to extend slightly below the end surface 24 of the head 20, which surface is preferably slightly convexed and terminated by a rounded annular edge 25. The height of the semispherical portion 19 is substantially greater than the depth of the socket 18, thereby causing the shoulder 22 to remain longitudinally spaced from the end of the shank member, while the sleeve 23 is made to be under a slight tension between the shoulders 17 and 22 to maintain the end portion 19 of the head 20 in constant engagement with the wall of the socket 18, well enabling limited swivelling motion of the head relative to the shank member 11.

In the modification shown in Fig. 3, the head 120 is similar to the head 20 in Fig. 1, but is provided with a depending tapered outer end 26 having its outer end surface 124 concaved or cup shaped as at 27 to receive the rounded head of a rivet.

In the modification shown in Fig. 4, the shank member 211 is also formed with an enlargement 216 terminated by a semispherical head 218 on which is swivelly mounted a socket 220 held on the shank 211 by a sleeve 223 similar to the sleeve 23 in Fig. 1. The outer end surface 224 of the socket 220 is also slightly convexed and bordered by a rounded annular edge 225. This construction is exactly the reverse of that shown in Fig. 1 and is capable of performing the same functions.

In the modification shown in Fig. 5, the swivelling head 320 is mounted within a semispherical socket 318 formed in the end of a bucking bar 28, and retained therein by a sleeve 323 corresponding to the sleeve 23 in Fig. 1.

In the modification shown in Fig. 6, the shank member 411 is also provided with an enlarged end portion 416 which has its outer end provided with a semispherical socket 418 within which is swivelly mounted the semispherical end portion 419 of a head 420, which also includes a reduced cylindrical portion 421. Between its ends, the head 420 is provided with an annular recess 422 within which is mounted one end coil of a tension spring 423 having its other end mounted within an annular recess 417 formed on the enlarged portion 416 of the shank member 411. In other words, this construction is similar to that shown in Fig. 1 except that the resilient sleeve 23 has been replaced by a tension spring 423.

In the operation, it will be understood that the improved rivet set may be used to produce either the usual flush type of rivet heads, or the regular crowned type of heads. When producing the flush head type, the work or sheets to be riveted together are first dimpled to accommodate the head of the rivet. After the insertion of the rivet in the work, the rivet set is applied on the work or more specifically on the head of the rivet, while a bucking bar is held against the shank of the rivet extending from the other side of the work. When applying the improved rivet set to the work, the sleeve 23 which extends slightly below the end of the rivet head 20 will first engage the work to normally maintain the rivet engaging face 24, of the head 20 slightly away from the rivet head. Upon pressure exerted on the riveting hammer, the front end of the sleeve will be compressed or distorted sufficiently to enable contact of the head 20 with the rivet. In this instance, the rivet contacting face 24 of the rivet head 20 being slightly concaved will tend to engage the central portion of the rivet head while remaining in spaced relation with the work. Due to the swivel connection between the head 20 and the shank member 11, it is possible for the operator to maintain the end face 24 of the head 20 substantially parallel with the work even though the center axis of the shank 11, and consequently that of the riveting hammer, is moved laterally or positioned obliquely relative to the work as shown in dotted lines in Fig. 1, thereby facilitating the use of a riveting hammer without danger of the rivet set denting, marking or otherwise injuring the work around the rivet head. The outer end of the flexible sleeve 23 engaging the work, will also act as a protection against accidental slippage of the rivet set laterally of the rivet, there being sufficient friction between the flexible sleeve and the work to maintain the rivet set, or more particularly the head 20 thereof, in operative engagement against lateral slippage.

With reference to the modification shown in Fig. 3, it will be understood that due to the swivel connection between the shank member 111 and the head 120, it will also be possible to drive or maintain the head axially with the rivet well enabling limited lateral movement or misalignment of the shank 111.

Obviously in the modification shown in Fig. 4, the operation resulting in the flush head type of rivets, will be identical to that above described in connection with the construction shown in Figs. 1 and 2.

When using a bucking bar as shown in Fig. 5, it will be understood that due to the swivel joint between the head 320 and the bar 28, it will also be possible for the operator to maintain the head 320 in axial operative engagement with the rivet, while enabling limited lateral movement or misalignment of the bar 28. In the event the bar is used for bucking the head of the flush rivet shown in Fig. 1, the sleeve 323 engaging the work or plate intended to be riveted, will also prevent accidental slippage of the bar relative to the work.

In the modification shown in Fig. 6, the riveting operation may take place as explained in connection with the construction shown in Figs. 1 and 2. However, while the spring 423 enables limited swivelling movement of the head 420 relative to the shank member 411, it will be understood that in this last modification the spring is not capable of frictional engagement with the work for preventing accidental slippage of the rivet set from the work.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A rivet set including an elongated shank member formed with an enlarged end, a rivet engaging head extending axially from said end, a ball and socket joint between said end and head, and a retaining flexible sleeve operatively engaging said end and head, said sleeve surrounding said end and the portion of said head extending therefrom for limiting swivel movement of said head relative to said shank.

2. A rivet set including a shank member, a rivet engaging head mounted on one end of said member, and a retaining sleeve carried by said member operatively engaging said head, said sleeve being made of nonmetallic resilient material and extending slightly beyond the free end of said head.

3. A rivet set including a shank member, a rivet engaging head mounted axially on one end of said member, a ball and socket joint between said one end and head, and a resilient sleeve gripping said shank and head and slightly stretched therebetween for assuring contact of said head with the one end of said shank.

4. A rivet set including a shank member, a rivet engaging head swivelly mounted on one end of said member, and a retaining rubber sleeve carried by said member operatively engaging said head, said sleeve extending beyond said head for frictional engagement with the work to be riveted during normal operative engagement of said head with the rivet.

5. A rivet set including a shank member, a rivet engaging head swivelly mounted on one end of said member, and nonmetallic flexible retaining means carried by said member operatively engaging said head, said means extending beyond said head for frictional engagement with the work to be riveted during normal operative engagement of said head with the rivet.

EARL B. LEAR.